US009433157B2

(12) United States Patent
Dermitzakis et al.

(10) Patent No.: US 9,433,157 B2
(45) Date of Patent: Sep. 6, 2016

(54) EMITTER AND METHOD FOR OPENING WATER OUTLET OPENINGS

(76) Inventors: Emmanuil Dermitzakis, Athens (GR); Aristeidis Dermitzakis, Athens (GR)

( * ) Notice: Subject to any disclaimer, the term of this patent is extended or adjusted under 35 U.S.C. 154(b) by 330 days.

(21) Appl. No.: 13/823,288

(22) PCT Filed: Sep. 20, 2011

(86) PCT No.: PCT/GR2011/000039
§ 371 (c)(1),
(2), (4) Date: Mar. 14, 2013

(87) PCT Pub. No.: WO2012/038766
PCT Pub. Date: Mar. 29, 2012

(65) Prior Publication Data
US 2013/0181066 A1 Jul. 18, 2013

(30) Foreign Application Priority Data
Sep. 20, 2010 (GR) ................. 20100100517

(51) Int. Cl.
*B05B 15/00* (2006.01)
*A01G 25/02* (2006.01)
(52) U.S. Cl.
CPC ............ *A01G 25/02* (2013.01); *A01G 25/023* (2013.01); *A01G 25/026* (2013.01); *Y10T 83/04* (2015.04)
(58) Field of Classification Search
USPC ........................................................ 239/542
See application file for complete search history.

(56) References Cited

U.S. PATENT DOCUMENTS

| 4,210,287 A * | 7/1980 | Mehoudar ..................... 239/542 |
| 5,636,797 A * | 6/1997 | Cohen ........................... 239/542 |
| 7,681,805 B2 * | 3/2010 | Belford et al. ................. 239/11 |
| 2002/0166907 A1 * | 11/2002 | Boswell et al. .............. 239/542 |
| 2006/0186228 A1 | 8/2006 | Belford et al. |
| 2006/0237561 A1 * | 10/2006 | Park et al. .................... 239/542 |
| 2007/0194149 A1 | 8/2007 | Mavrakis et al. |
| 2013/0248616 A1 * | 9/2013 | Ensworth et al. ............. 239/11 |

FOREIGN PATENT DOCUMENTS

| EP | 0970602 A1 | 7/1998 |
| EP | 1541014 A1 | 12/2004 |
| WO | 9205689 A1 | 4/1992 |
| WO | 9955141 A1 | 11/1999 |
| WO | 9962691 A1 | 12/1999 |

* cited by examiner

*Primary Examiner* — Len Tran
*Assistant Examiner* — Adam J Rogers
(74) *Attorney, Agent, or Firm* — Karl F. Milde, Jr.; Eckert Seamans Cherin & Mellott LLC

(57) ABSTRACT

The irrigation matter (1) of the present invention is inserted and welded in the interior of a drip irrigation pipe (2) during production thereof. It has a number of protrusions (8) arranged in a row emerging from a solid flat part/base (6) of the outer convex surface (7) of the emitter (1). The pipe (2) is locally swollen, covers and is welded both on the protrusions (8) and on their base (6), so that a unified welded assembly is formed between protrusions (8) and the pipe. The water outlets (10) are typically and preferably formed between the prismatic protrusions (8) by cutting off the tips of the protrusions (8) during passage of the drip irrigation pipe in a continuously rotating concave fraise (35) located at the end of the production line. Cutting takes place after the pipe has passed through a system of successive pairs of concave and convex rollers which squeeze it, stretch it and make it rigid, maintaining it in a flattened convex and bent form.

8 Claims, 4 Drawing Sheets

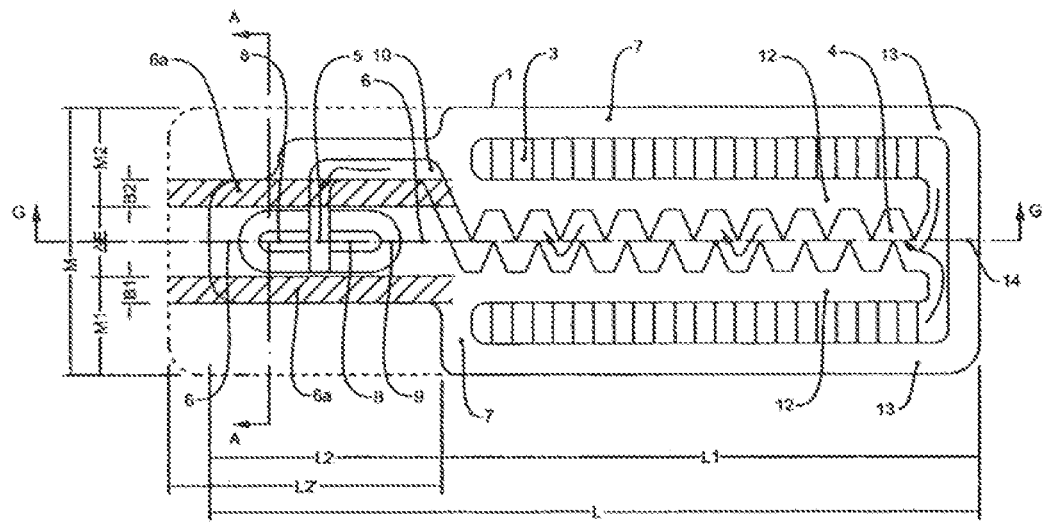
Fig. 1
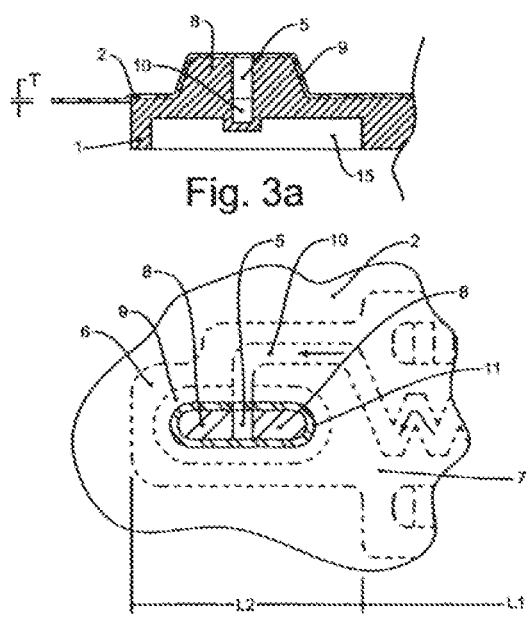
Fig. 3a
Fig. 3
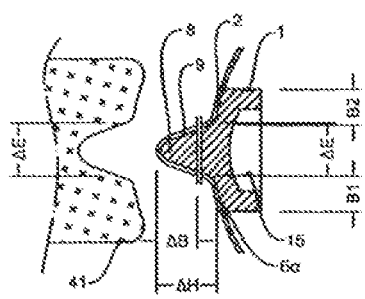
Fig. 2

EMITTER AND METHOD FOR OPENING WATER OUTLET OPENINGS

BACKGROUND OF THE INVENTION

The present invention refers to a build-in linear emitter for irrigation, which is inserted and welded into the interior of a drip irrigation pipe during its production phase, allowing a subsequent cutting-off of a specific part followed by an automatic perforation of the drip irrigation pipe for the creation of outlet openings for the water, as well as a method for inserting and incorporating the emitter into the irrigation pipe.

The drip irrigation pipes with build-in emitters are a complex product and constitute the most important element of drip irrigation. The reliability of their function as well as their production cost, characterize the quality, cost, and agricultural development in its entirety.

The investment cost for the production lines of drip irrigation pipes is also substantial. Of particular importance is the cost of the sophisticated mechanism for orienting, inserting and detection of the emitters, as well as for the perforation of the irrigation pipes, exactly at the area of a necessarily wide basin for the outlet and for the final collection of the water at the end of the paths in the interior of the emitter, in order for the water to be discharged on the soil.

The size of the problem will be understood, if we consider that the emitters are inserted at a speed and frequency of over 1000 emitters per minute. Hence, the production of up-to-date drip irrigation pipes is an exclusive privilege of financially strong companies and the cost of the end product is substantially incurred by the cost of the sophisticated investment.

There are several known systems for insertion and incorporation of common emitters, wherein their position, and in particular that of the wide outlet basin, should then be detected and the drip irrigation pipes should be perforated. Exemplarily, EP 0 970 602, EP 1006778, WO 99/62691 are mentioned.

Other patents, such as EP 1 541 014 A1, US 2007/194149 A1, also provide the known wide water outlet basins, with special protrusions from the bottom of the basins, the protrusions having a significant height. The tip of the protrusion along with a part of the pipe covering them is cut off in a subsequent stage, thus forming the water outlet openings. The problems presented in the above-mentioned technologies are both due to the insertion method and to the emitters themselves.

In particular, in EP 1541 014 A1, as a result of the unified and uniform concave shape/profile of the tread, the elastic material of the wheel will be locally compressed and withdrawn at a greater extent in the area of the protrusions, a cavity will be formed there which will have the shape of a concave surface of a frustum cone or a frustum pyramid with a very extended base surface in relation to its height. The same concave shape will be adopted by the warm pipe under configuration due to the negative pressure in the cooling bath, with the result that the system will not work, for two reasons: a) the dimensions of the base of the hollow pyramid of the swelling around and above the water outlet basin of the emitter should exceed the limited width of the emitter itself, and b) due to the vacuum in the cooling bath, the swollen material will tend to detach, preventing the pipe from welding on the sides of the emitter protrusions.

Similar problems appear in US 2007/194149 A1: For example, this patent employs a conventional wide water outlet basin with the known common problems in this art, e.g. the reduction in water flow velocity with a subsequent inefficient washing thereof, the presence of impurities and a gradual clogging of the water paths, which constitutes the major problem of the drip irrigation. In particular, a high protrusion is raised above the bottom of the outlet basin, however without providing a base of the protrusion at the height of the outer solid and full cylindrical surface by which the emitter is welded on the pipe, and without right and left transverse bars which ensure the welding of the swollen part of the pipe directly on the protrusion, such that the welding and finally the cutting-off is facilitated. The swollen pipe remains suspended and free around the protrusion, being welding only on the protrusion tip.

Also the technology of WO 92/05689 regards self-adjustable emitters having an irregular and intensely convex, non-cylindrical shape, which are inserted and welded in the interior of the pipe, swelling the whole pipe locally. These have a cannula also covered by the walls of the pipe, which will be cut off in a subsequent phase by a rotating cutting device, thus forming a water outlet to the ground. The disadvantages of this technology is the fact that again there is one and only water outlet, through the above mentioned cannula, which directly communicates with the sensitive self-adjustment chamber of the water supply inside the emitter, which increases the susceptibility and delicacy of the system to the random inflow of foreign matter (debris) from the ground and not from the water itself, as in the previous cases, since the single end of the cannula lies on the soil. Another disadvantage is the fact that for the welding of the emitter, the pipe is swollen locally and intensely in a wide area beyond the protrusion area, and the thickness of its walls becomes peripherally smaller over the entire cross-section. The pipe becomes thinner not only over the part that is occupied by the emitter but also over the whole free cross-section, resulting to a reduction in the pipe strength to internal functional high hydraulic pressures. In addition, to produce such a sophisticated pipe with extreme large and intensive swollen areas, that cannot be calibrated, is not at all an easy task. Furthermore the surface of the end product is rough and due to the lack of calibration, with non equal outer diameter and wall thickness even between the swollen areas (emitters).

US 2006/186228 discloses a dripper adapted to be bonded to interior of an irrigation pipe during manufacture and to be associated with an outlet opening in said pipe. The dripper comprises an outwardly facing surface adapted for the bonding, an outlet area associated with the surface, and at least one bulge near the outlet area. The bulge defines an outermost portion of the surface at least during manufacture of the pipe, and is adapted to form, when the dripper is bonded to the pipe, a raised outlet region in the pipe associated with the bulge. The bulge and outlet area are designed so as to form the raised outlet region suitable for at least a part of the outlet opening to be formed therein and be defined by the material of the pipe.

EP 1 541 013 disclose s a droplet former, designed to located at intervals to the inside of an irrigation pipe to control the flow of water through its outlets, which consists of a plastic bar with a water collection chamber fed by a passage and a labyrinth channel. The bar is attached to the inner surface of the irrigation pipe, especially by welding, that the collection chamber is aligned with a pipe outlet. The collection chamber has a central projection that lifts the wall of the irrigation pipe from the inside so that it can be trimmed to make an outlet with its edges in contact with the projection to form a valve.

Regarding the cutting devices described in the EP 1 541 014 A1 wherein the fraise bears a simple cylindrical profile and the pipe is flattened only by stretching it on a big dram. The disadvantages are the following: a) the pipe neither can be nor remain exactly flattened especially at both ends of the closed flattened profile of the pipe due to the fact that it is not continuously pressed from both sides, b) the flattened pipe could move sideways (left and right) on the dram causing problems by the cutting process c) the cylindrical profile of the fraise is not the best design since the pipe itself could be damaged from the fraise at areas it should not, especially at both ends (that are not pressed) of the closed flattened profile of the pipe which could emerge over the short protrusions (especially by thick wall pipes).

SUMMARY OF THE INVENTION

The irrigation emitter of the present invention is inserted and welded in the interior of a drip irrigation pipe during manufacturing thereof. It bears a number of prismatic or cylindrical protrusions with slightly inclined and conical sides, which emerge from a specific part of the solid full convex outer surface of the emitter and are arranged in a row along the emitter to minimize the occupied width, to reduce the total width of the emitter and to facilitate the formation of multiple water outlet openings.

The emitters do not comprise the known water outlet basin. The water reaches between the protrusions through a simple narrow outlet channel which constitutes an extension of the meandering path. The water supply between the protrusions is preferably effected perpendicularly to the longitudinal axis of the emitter.

The emitters are inserted in the interior of the pipe through a fixed calibrator present in the vacuum bath, whereas an elastic wheel is brought to contact and above the extruded pipe, the wheel being driven by a specific mechanism at a constant peripheral speed equal to the individual speed of the extruded pipe. The profile of the tread of the elastic wheel has preferably at its center a narrow groove separating the wheel to two thinner wheels with narrower treads which allow free passage of the protrusions of the emitter between them.

The raising of the protrusions directly from the convex and full surface of the emitter, the surface serving as a base that is welded and touches directly on the pipe, is a characteristic element for the construction and operation of the new emitter, since on these bases specifically the swollen, tensioned and necessarily thinner part of the pipe wall is welded, thus forming with the bases and the inclined sides of the protrusions a unified welded and compact assembly useful both during operation and during the effective creation of the water outlet openings. It should be noted that in the area of the bases no water passage channels or gaps are present, which otherwise would cause rupture of the pipe due to its thinner wall at the specific area.

The water outlets are formed from openings around or between these prismatic protrusions, which are created by cutting off the tips of the protrusions along with the welded part of the pipe covering these.

The cutting-off takes place during passage of the drip irrigation pipe through a continuously rotating preferably hollow/concave-profile fraise positioned before the hall-off, at the end of the production line. The pipe just before, as well as during cutting, passes through a system of pairs of convex and concave rollers that stretch, squeeze, and bend it and provide it with a slightly convex profile, multiply increasing the rigidity of the pipe and exposing the tips of the protrusions in the area of the hollow-profile cutting fraise to a greater degree.

For a full understanding of the present invention, reference should now be made to the following detailed description of the preferred embodiments of the invention as illustrated in the accompanying drawings.

BRIEF DESCRIPTION OF THE DRAWINGS

FIG. 1 shows in plan view an asymmetrical, linear, non-self-adjustable emitter with the protrusions for the creation of outlet openings, and the outlet channel between the protrusions.

FIG. 2 shows the cross-section A-A of the emitter of FIG. 1 along with the part of the pipe which covers it.

FIG. 3 shows a plan view of the drip irrigation pipe of the emitter of FIG. 1, with a part of the pipe after cutting-off the tips and creating the water outlet opening.

FIG. 3a shows the cross-section G-G of the emitter of FIG. 1 along with the part of the pipe covering it.

DETAILED DESCRIPTION OF THE INVENTION

Figure 4:
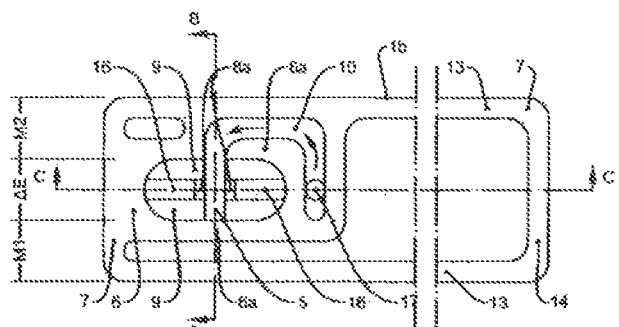
FIG. 4 shows a plan view of the convex surface of a linear self-adjustable emitter with the protrusions, their base, and the outlet channel.

The preferred embodiments of the present invention will now be described with reference to FIGS. 1-14 of the drawings. Identical elements in the various figures are designated with the same reference numerals.

FIGS. 1, 2, 3, 3a show plan views and a cross-section of an asymmetrical, linear non-self-adjustable emitter 1 adapted to be welded in the interior of a pipe 2 during the production phase of the drip irrigation pipe. The emitter 1 as such has high-pressure regions, e.g. a water inlet filter 3, a meandering path 4 through which water passes under pressure reduction, and low-pressure regions, e.g. a water outlet channel and a water outlet opening 5, which constitute the end of the meandering path 4. Until the meander path 4, which is confined by the longitudinal sides 12 and in particular along the length L1, the emitter is common and known, confined by the peripheral walls 13 and 14. The conventional and wide, but now useless, water outlet basin is omitted, and has been replaced in the present case by a special arrangement on the front part 6 with a length L2 of the unified convex solid and full outer surface 7 of the emitter. The part 6 constitutes the base of the whole water outlet area. Above the part 6 of the outer surface 7, two characteristic protrusions 8 having a full or open profile, or a I or C-shaped profile of a significant height. The protrusions 8 have inclined sides 9 and are arranged in a row along the emitter. The water channel 10, a low-pressure area, ends between the protrusions 8, its last path being perpendicular to the longitudinal axis of the emitter. The emitter 1 is characterized as asymmetrical, since the water outlet 10 is located at its one end.

The height £ H of the protrusions 8, as measured from their base on the outer surface 6, is significantly larger than the thickness T of the pipe 2 covering these.

The emitter 1 is subsequently inserted slightly in the wall of the pipe 2, its convex outer surface 7 being covered completely, whereas the pipe 2 itself is swollen in the area of the protrusions 8, tensioned and becomes locally thinner, covering all the protrusions 8, the inclined sides 9 thereof, as well their extended bases 6.

A basic feature of the method is an elastic wheel 41 having a slightly concave tread profile which is slightly wider than the emitter, and which has at its center a narrow peripheral groove with a width ca. ΔE, separating the wheel to two thinner ones with narrower treads. The width ΔE, corresponds to the width of the protrusions 8, of the inclined sides 9 thereof as well as of the part of the pipe 2 which will be welded on the inclined sides 9. The emitters are inserted in the interior of pipe within the fixed calibrator in the vacuum bath, while in and above the extended pipe the elastic wheel 41 is rotated. The pipe 2 with a slightly welded emitter 1 is squeezed between a fixed guide-rod located in the interior of the produced pipe, and the elastic wheel which externally rotates, such that the protrusion 8 with the welded pipe 2 passes freely through the narrow peripheral channel extending between the wheels, while the treads of the wheels squeeze and stably weld the emitter in the pipe 2 along two specific zones of width M1 and M2 which correspond to the path, the traces and apparently to the width of their two treads.

It is clear that since this incorporation method will be preferably used, the narrower and more reliable the configured protrusion system the smaller the width £ E of the channel between the two wheels/treads, the smaller the whole width M of the emitter 1, and respectively the wider the zones M1, M2, and in general the larger the portion of the whole outer surface 7 of the emitter which is compressed by the wheel treads.

As already mentioned, in the present invention the useless and disadvantageous known water outlet basin is omitted, and all the new constructions use as base the front part 6 of the outer surface 7 of the emitter, which has a total length L2. It is clear that the narrow zones Ea of width B1, B2 (similar to the width of the limiting walls 12, 13, 14) configured directly after the protrusions 83 and the inclined sides 9 thereof, right and left, have a sufficient width so that they seal by direct compression of the elastic wheel all the operation parts of the new emitter. Thus, the total width of the zones: B+AE+B2, which constitutes the width of the emitter in the specific area has been kept particularly narrow, while as shown in the cross-sections of FIG. 2 and FIG. 3*a*, the space 15 under the area L2 of the emitter is the empty space of a shell, without any constructions, such as protrusions, partitions, bars etc. It should be noted that in all the known technologies of the prior art, both the basic protrusions and all the other auxiliary formations are raised from the bottom of the known outlet basin which they keep, despite the fact that it is useless and disadvantageous for the specific technologies.

The convex outer surfaces 7, 6 and 6*a* provide a safer setting for the welding, without any failures, and without the need for special various support constructions such as bars, partitions, and protrusion bases as those arisen in the known technologies from the bottoms of the outlet basin and adding unnecessary weight to an item which ideally should be manufactured as small and light-weight as possible for mass production. The water outlet system of the present invention could be characterized as a "reversed empty outlet basin with simple protrusions 8 on its outer convex part". Even the protrusions 8 of the present invention, compared to those of the other technologies configured/emerging from the bottom of the outlet basin of the emitter, have half the size/height and weight. In addition, the shorter the protrusions 8, the easier and faster the production process (e.g. simpler mold, less & smaller ejector pins, faster and safer ejection, less cycle time, etc.).

FIG. 1 shows for comparison with a dashed line, in the same scale, the outline of the respective known outlet basin as configured by all known technologies and methods used. The advantage of the present invention is obvious and significant.

Thus if the known part Li of the emitter is kept as such for all the relevant known technologies, and the comparison is limited to the individual part L2 and L2', i.e. in the outlet system they use, the present emitter is not only the smaller but also the more light-weight.

All the above considerations do not include the fact that in the common outlet basins the water flow velocity drops automatically in this area, due to the extremely large width, which favors the accumulation of foreign bodies contained in the water and clogging, which is the largest problem of the emitters. On the contrary in the present invention, the water flow velocity from the input/entering 3 in the meandering path 4, to the outlet 10 and 5 is constant and extremely high.

The combination of the minimum width and the empty shell/space 15 in the present invention provides the optimal results. The whole water outlet system in the present invention is in fact very simple. It is a narrow empty shell having a row of protrusions 8 on its outer solid surface. Thus, all the objectives of the present invention, from the construction reliability and the reduction of the width M to the decrease in the emitter weight, have been optimally solved.

For the unobstructed operation of the emitter, the pipe should be welded uniformly and sealingly along the zones M1, M2 right and left of the protrusions 8, since these areas, which comprise vital parts for the operation of the emitter where different pressures apply, should not communicate between them due to welding failures on the pipe 2. At this point, a significantly narrow width L\E is decisive for the present invention. The outer surface-base 6 and 6*a* may in certain cases be separated by surface shallow engravings to many smaller surfaces (Not shown). Similar shallow engravings may be configured for the same reason on all the sides of the protrusions 8 (Not shown). The protrusions may have on their back deep vertical incisions so that their weight is further reduced and the welding of the pipe is facilitated (Not shown).

The longitudinal welding surfaces 6*a* having a width of B1, B2, right and left of the protrusions 8, are obviously contained in the compression zones M1, M2 however they also constitute the inner limit of these zones.

In a subsequent stage, and after the drip irrigation pipe 2 has been cooled, it is passed through a cutting device wherein a cutting mechanism is permanently and constantly rotating at a specific height above the passing pipe 2, cutting off the part AB of the tip of the protrusions 8, along with the pipe covering it.

As shown in all the figures, the point from which the inclined sides 9 and the protrusions 8 arise starts from the outer surface of their base 6 and in contact with the narrow compression zone 6a. This fact reinforces and favors the possibility for full covering and welding of the pipe 2 on the whole external surface of the emitter. Thus, the whole swollen part of the pipe, right and left, front and back of the protrusions 8, the inclined sides 9 and the bases 6, will constitute a unified compact welded assembly which will contribute significantly during cutting-off.

Between the protrusions 8, an outlet opening 5 is formed after cutting off the tip, which has the lips 11 remaining after swelling and tensioning of this part of the pipe (FIG. 3).

In particular, the welding of the part of the thinner swollen walls of the pipe on the bases of the emitter does not causes any risk for rupture by the hydraulic operation pressure, since they are welded exclusively on a solid and full external surface 6 and 6a and not on the gaps through which water flows. On the contrary, all the surfaces of the emitter with gaps, paths and water circulation, which are thus exposed to hydraulic pressure, are covered by normal pipe with nominal thickness T.

Figure 5:
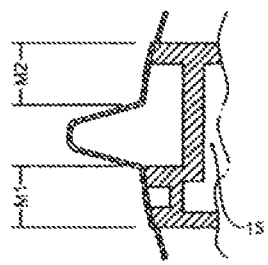
FIG. 5 shows the cross-section B-B of the emitter of FIG. 4 along with the part of the pipe covering it.
Figure 6:
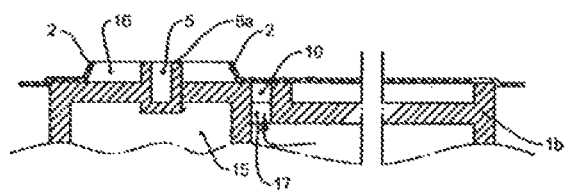
FIG. 6 shows the cross-section C-C of the drip irrigation pipe of the emitter of FIG. 4 along with a part of the pipe with the water outlet opening after cutting off the tips.

FIGS. 4, 5, 6 depict the plan view and the cross-sections B-B and C-C respectively of the convex surface 7 of a linear self-adjustable emitter 1b, the protrusions 8a and their bases 6 and 6a extending around them and constituting a part of the convex surface 7 of the emitter 1b. The protrusions have on their back a deep perpendicular incision 16 so that their weight is reduced and the welding of the pipe is facilitated. The water supplies the outlet channel 10 through the communication hole 17, the delicate self-adjustment basin of the water supply being located in the interior of the emitter (not shown in the figures). Also the two active zones having a width of M1, M2, right and left at a distance AE between them are shown. In the self-adjustable emitter 1b as in the non-self-adjustable ones 1, 1c, 1d, all the basic features, as well as process for opening the outlet openings on the drip irrigation pipe by cutting off the tips, are the same and will not be described any further.

Figure 7:
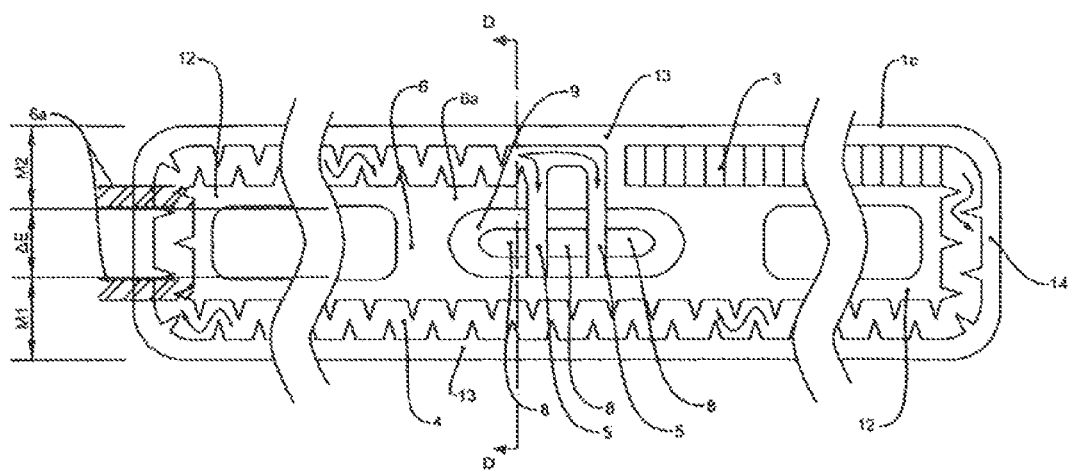
FIG. 7 shows a plan view of a linear symmetric, non-self-adjustable emitter with two outlet openings and three protrusions in a row.
Figure 8:
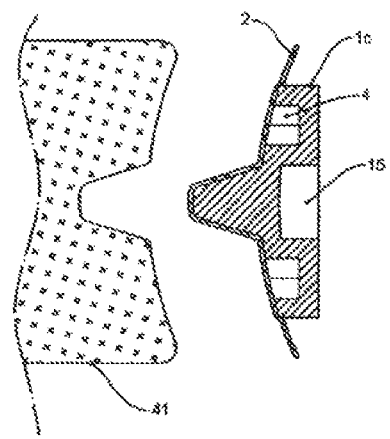
FIG. 8 shows the cross-section D-D of the emitter of FIG. 7 with a part of the compression wheel.
Figure 11:
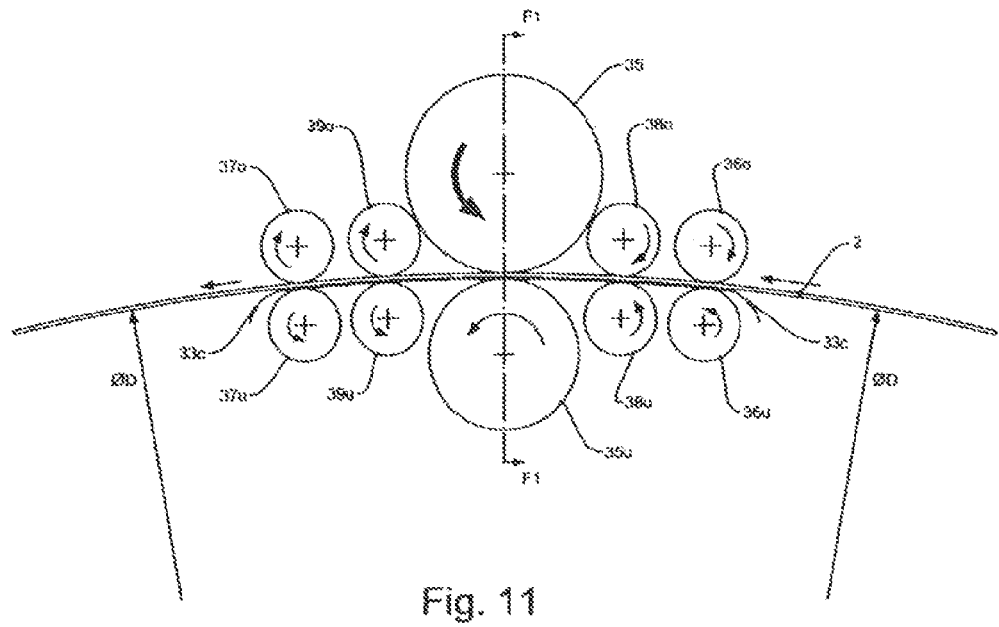
FIG. 11 shows a typical general device for cutting off the tips of the protrusions for the creation of the outlet openings.

FIGS. 7, 8 show in plan view and cross-section of a symmetrical, non-self-adjustable emitter 1c. The emitter 1c is considered as symmetrical, since the outlet openings 5 are located at the center of the emitter form. A plurality of protrusions 8 for the creation of the multiple water outlet openings 5 are shown, as well as the limiting walls 12, and the two active zones of width M1, M2, right and left of the protrusions. Also the base 6 is shown, as well as the active zones 6a which are aligned and have identical width with the partitions 12 of the meandering paths 4, allowing a full isolation during compression and welding of the high and low pressure areas, which are in the present case the area of the filter 3, and the area of the meandering path 4 with the outlet channel 10 respectively. Also the empty space 15 under the base 6 is also shown.

Figure 9:
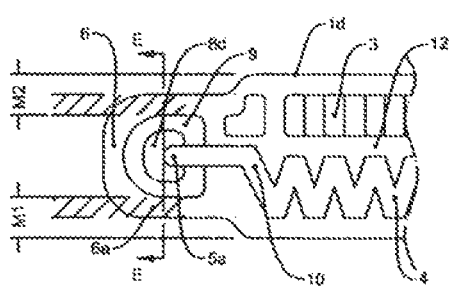
FIG. 9 shows a plan view of a linear asymmetric non-self-adjustable emitter with C-profiled protrusions.
Figure 10:
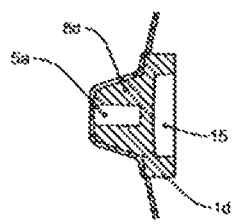
FIG. 10 shows a cross-section E-E of irrigation pipe of the emitter of FIG. 9 with the pipe.

FIGS. 9, 10 depict a plan view of an asymmetrical, non-self-adjustable emitter 1d, wherein the protrusion 8a is C-shaped with inclined sides 9, and the opening 5a for the outlet opening is already configured between the arms of the protrusion. The water outlet channel 10 at the center of the form is also shown and axially supplies the protrusion 8a, as the two active zones of width M1, M2, right and left of the protrusions. As in all the previous figures, the base 6 and the narrow compression zones 6a, right and left of the protrusions 8a, are shown.

Emitters having S- or I-profiled protrusions could also be present. In these case, in each cutting-off of a tip, two water outlet openings are automatically configured, one right and one left respectively, in the two cavities of the S and I-shapes (not shown).

Also, linear, non-self-adjustable emitters having the protrusions 8 out of the central symmetry axis of the form could also be present (not shown).

It is clear, that all the above emitters and variations thereof are preferably associated directly with the above-mentioned specific method for insertion and welding, with which they constitute a system, without being limited to it.

It should be noted that all the known outlet basins in the conventional known flat emitters of the state of the art are particularly spacious with a total inner width more than 6.5 mm, so that they can be detected easily and quickly. Easy detection was a necessary feature for the liable perforation so that the water outlet opening is pierced by the conventional way of the state of the art, strictly in the said area. Such a chamber is used as such from EP 1 541 014 A1.

In the present invention, such a basin would be useless, and would be disadvantageous. On the contrary, water discharge is served according to the present invention by a simple narrow outlet channel 10, which constitutes the natural extension of the meandering path 4, and in parallel serves in cooperation with the protrusions 8 and their bases completely different goals: a) it supplies water with high flow velocities, as a simple narrow water conduit, from the meandering path 4 into the area of the protrusions 8 and the outlet openings 5, b) aids due to its small dimensions in the full covering and welding of the swollen pipe 2 on the emitter and in particular on the protrusions 8 and the solid areas 6a, so that all these elements along with the pipe constitute a unified and closely connected assembly without welding voids from intermediate gaps, which is useful for the subsequent and important cutting-off.

The narrow outlet channel 10, and the accompanying increase in water flow velocity in the same area, reduces drastically the probability for accumulation of foreign bodies contained in the water.

If the wall of the locally swollen pipe in the present invention were not welded on the protrusions and their bases tightly and completely and without voids, but it were relatively free and not welded regularly at some points, as it is the case in the known technologies, it would create a form of free cone, stretched but not very closely welded around the protrusion 8. As a result, a local cutting-off of the pipe/cone in the respective stage would not be controlled, thus the pip would be locally torn, without allowing a full cutting-off for the creation of a specific clean outlet opening. It is apparent that in the specific case, the tip of the protrusion 8, although probably cut-off, will not be fully removed, but it would remain connected to a part of the pipe wall on the drip irrigation pipe. The technology EP 1 541 014 A1 of the state of the art, which uses the conventional outlet basin as such, cannot deal these problems.

It is clear from the above that the characteristic form and the details of the emitter are provided as a consequence and result of a) the insertion and welding method and b) the method for cutting off the tips (see FIGS. 11, 12, 13, 14) to which they are preferably adjusted.

It is apparent that new variations with combinations of the above-mentioned elements may be created, as well as variations wherein the emitter is a continuous band (not shown).

After cooling of the pipe and before the hall-off mechanism of the production line, a system for cutting off the tips is installed. In order to ensure the necessary tension, which will hold the pipe permanently stretched and rigid, a complex automatic tensioning mechanism is installed along with the mechanism for cutting off the tips of the protrusions 8. If two successive hall-offs are present on the same production line, the cutting-off mechanism is positioned between them.

The cooled pipe 2 with the welded emitter 1 passes through successive pairs of compression rollers 36o/36u, 38o/38u, 39o/39u, 37o/37u, wherein the individually first roller of each pair (index o) is above the pipe, while the second one (index u) is below. The rollers are made of metal or elastic material, are not self-driven and have a tread width approximately equal to the width of the pipe 2 in the fully flattened state. The upper rollers 36o, 38o, 39o, 37o of the pairs have a concave tread, and have at the center of their tread an engraved peripheral groove of large width and sufficient depth, so that the protrusion 8 and the swollen pipe covering the latter pass freely, whereas the lower rollers have a respective convex tread. The upper concave rollers stretch and squeeze the pipe on the convex lower rollers, as well as on the convex and bent metal surface 33c located between those but under the passing pipe. With this arrangement, the pairs hold between them the pipe permanently grasped, stretched and flattened in convex and bent form/cross section. The convex cross-section is a simple geometrical shape which however increases the rigidity of the pipe significantly. Since the contact with the convex metal surface 33c is insignificant, during compression rolling friction occurs exclusively. See FIGS. 12, 13.

At approximately the center of the pairs and above the pipe, there is a cutting fraise 35 having a width AF. It applies £FSA, wherein A is the width of the configuration of the pipe in its flattened form. The cutting fraise 35 is rotated with high speed preferably in the opposite direction to the motion of the passing pipe 2 so that the two speeds sum up during cutting, at a constant height AK above the ends of the flattened convex pipe 2, cutting off the end £B (FIG. 2) of the protrusion 8 along with a part of the pipe and creating the water outlet opening 5. The motion of the fraise 35 at a constant height above the pipe, as well as the stretching to a convex and bent cross section of the flattened pipe are ensured by the pairs of rollers/wheels.

Figure 14:
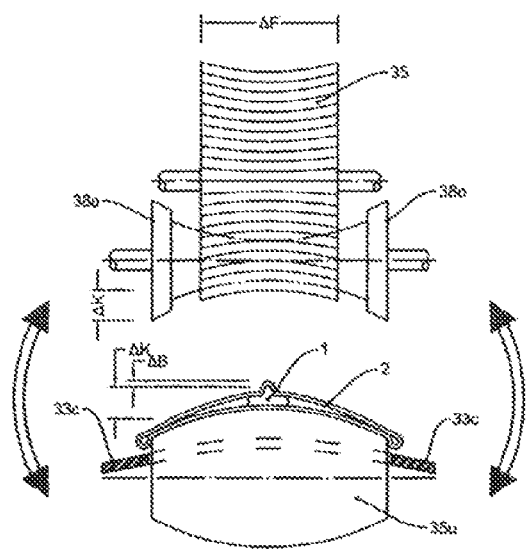
FIG. 14 shows a cross-section F1-F1 of a typical device of FIG. 11.
Figure 13:
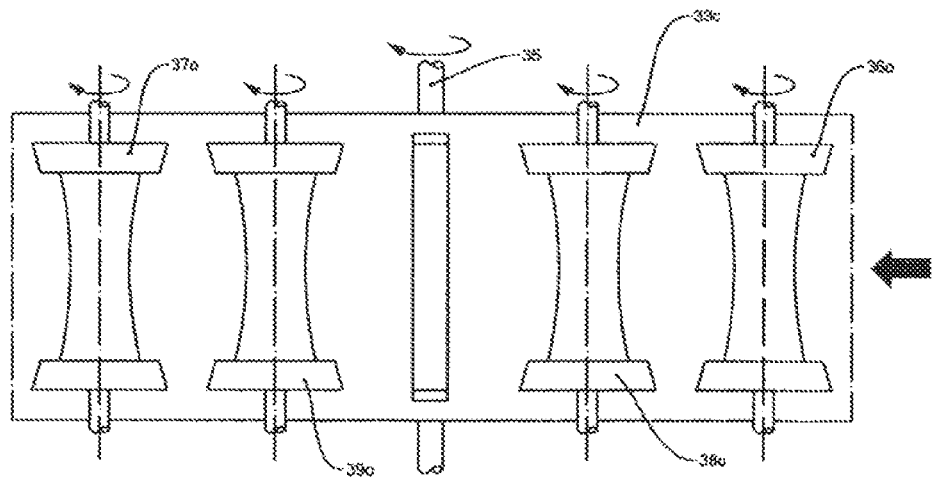
FIGS. 12, 13 depict the plan views of the rollers, below the passing pipe, and above the passing pipe respectively, without the pipe and the fraise.
Figure 12:
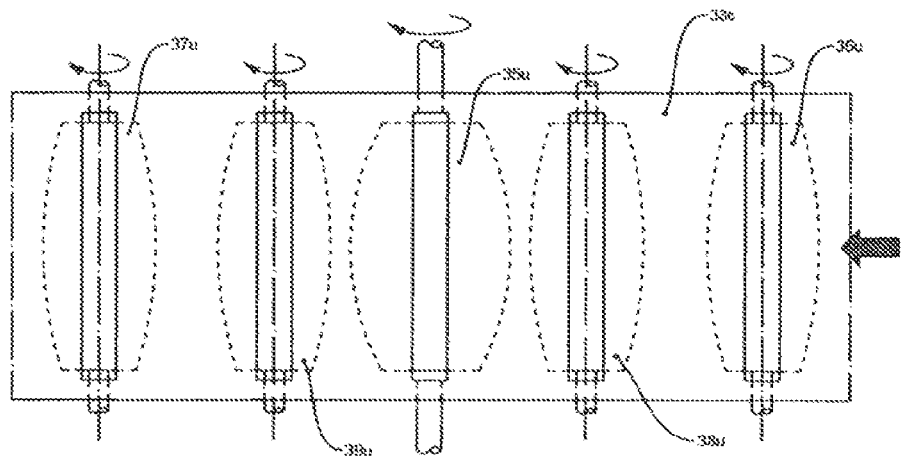

In FIG. 14, the whole upper system of rollers with the fraise 35 is arbitrarily elevated against the lower system and the metal surface 33c, so that the distances, details as well as the single roller 35u with the convex profile, exactly under the concave fraise 35, are shown.

In the flattened variation of the pipe, wherein the closed pipe profile is flat instead of convex, it is clear that the fraise, as well as all the rollers, have a simple cylindrical profile (not shown).

It is clear that the rigidity of the pipe is reinforced to a greater extent with the convex and bent variation.

It is also clear that for unobstructed cutting-off, the increased rigidity is an essential advantage whereas the convex form of the pipe, towards the fraise, reveals more intensely the tips of the protrusions to the concave cutting fraise, even when the emitter and thus the positions of the protrusion have for some reason been shifted to the right and left (sideways) from the axis of the cutting mechanism. With the convex and bent shape of the pipe, there is no danger for failure or for cutting-off of a part of the pipe (i.e. both ends of the closed flattened profile) along with the protrusion.

The whole cutting system can rotate slightly both clockwise and counter-clockwise around the longitudinal axis of the pipe (see directional arrows).

The present mechanism may be used in other relevant technologies, wherein cutting-off of tips for the creation of water outlet openings is required.

It is apparent that variations can be provided with combinations of the above-mentioned elements, as well as the use of the mechanism also in variations wherein the emitter is of continuous form.

The invention claimed is:

1. A linear irrigation emitter adapted to be welded on the interior of a pipe during production of the pipe, said emitter bearing a meandering path having an inlet at the beginning and an outlet after it, with a convex cylindrical surface which is covered by the pipe, wherein the emitter protrudes from the interior of the pipe and has local protrusions of width $\Delta E$ emerging substantially above the convex surface of the emitter, wherein the pipe covers the protrusions, including the local protrusions, in addition to the convex surface of the emitter, wherein the tips of the protrusions are cut-off during passage of the pipe through a cutting device in the pipe production line and wherein the water outlet openings are created adjacent the protrusions, the improvement wherein said protrusions of width $\Delta E$ are based on an outer solid convex cylindrical surface of a narrow empty shell, said surface being the outer cylindrical surface of the emitter directly welded into the pipe, wherein the connection of the water meandering path with an end outlet opening of the emitter is a short narrow channel constituting a direct extension and continuation of the meandering path, said channel having in its entire length substantially the same cross section with the meandering path and said channel being directly at its entire length welded into the pipe forming a continuous water flow path from the meandering path up to the end outlet opening, of substantially the same cross-section, wherein the emitter bears longitudinal narrow zones at the convex solid cylindrical outer surface and in direct continuous contact to the left and to the right of the protrusions having widths B1 and B2 respectively, and wherein the zones extend at a significant length before and after the protrusions, being both the zones and the protrusions side by side and at their entire solid surfaces of width B1+$\Delta E$+B2 directly welded into the pipe, configuring a solid continuous base around said protrusions.

2. A linear irrigation emitter according to claim 1, in which a width (B1+B2$\alpha\Delta E$) of the outer convex surface of the narrow empty shell of a length L1, is equal to the total width of the emitter in this area and less than the nominal width M of the emitter, wherein B1+B2+$\Delta E \leq M$, where the widths B1 and B2 are at least similar to the limiting walls and $\Delta E$ is equal or a little wider than the width of the protrusions.

3. A linear irrigation emitter according to claim 1, in which the protrusions are arranged in a row, wherein the outlet openings are formed between two successive protrusions and the connecting channels are perpendicular to the longitudinal axis of the emitter ending between the protrusions.

4. A linear irrigation emitter according to claim 1, in which the emitter is symmetrical with respect to its central transverse axis with the protrusions located in the middle of the emitter.

5. A linear irrigation emitter according to claim 1, further comprising active zones (M1 and M2) containing meandering paths or filtering rows, left and right of the protrusions and after the longitudinal zones and the base of the protrusions, parallel to the longitudinal axis of the emitter.

6. A linear irrigation emitter according to claim 1, in which the protrusions have a profile form selected from the group consisting of a "C", an "S", and an "I" shape.

7. A linear irrigation emitter according to claim 1, in which the emitter is of a continuous hand form.

8. A linear irrigation emitter adapted to be welded on the interior of a pipe daring production of the pipe, said emitter having an inlet and an outlet of the water and bearing a convex cylindrical surface which is covered by the pipe, wherein the emitter protrudes from the interior of the pipe and has local protrusions of width $\Delta E$ emerging substantially above the convex surface of the emitter, wherein the pipe covers the protrusions in addition to the convex surface of the emitter and also the local protrusions, wherein the tips of the protrusions are cut-off during passage of the pipe through a cutting device in the pipe production line and wherein the water outlet openings are created adjacent the protrusions, wherein the water is coming to the cylindrical outer surface being already controlled by a delicate self-adjusted basin chamber of the interior of the emitter through a communication hole, said hole connecting the self-adjusted basin chamber and the interior of the emitter with the convex cylindrical surface, the improvement wherein the protrusions of width $\Delta E$ are based directly on an outer solid convex cylindrical surface of a narrow empty deep incision-shell, said surface being the outer cylindrical surface of the emitter and is directly welded into the pipe, wherein the water coming from the communication hole is supplying directly an outlet channel which is engraved at the solid outer convex surface of the emitter being directly at its entire length welded into the pipe, said outlet channel guides the water direct to the protrusions and the end outlet of the pipe emitter forming a continuous water flow path from the communication hole up to the end outlet of the emitter of substantially the same cross-section with the communication hole, wherein the emitter bears longitudinal narrow zones at the convex solid cylindrical outlet surface and in direct continuous contact to the left and to the right of the protrusions and wherein the zones extend at a significant length before and after the protrusions, being both the zones and the protrusions side by side and at their entire solid surfaces of width $B1+\Delta E+B2$ directly welded into the pipe, configuring a solid continuous base for said protrusions.

* * * * *